Figure 1:
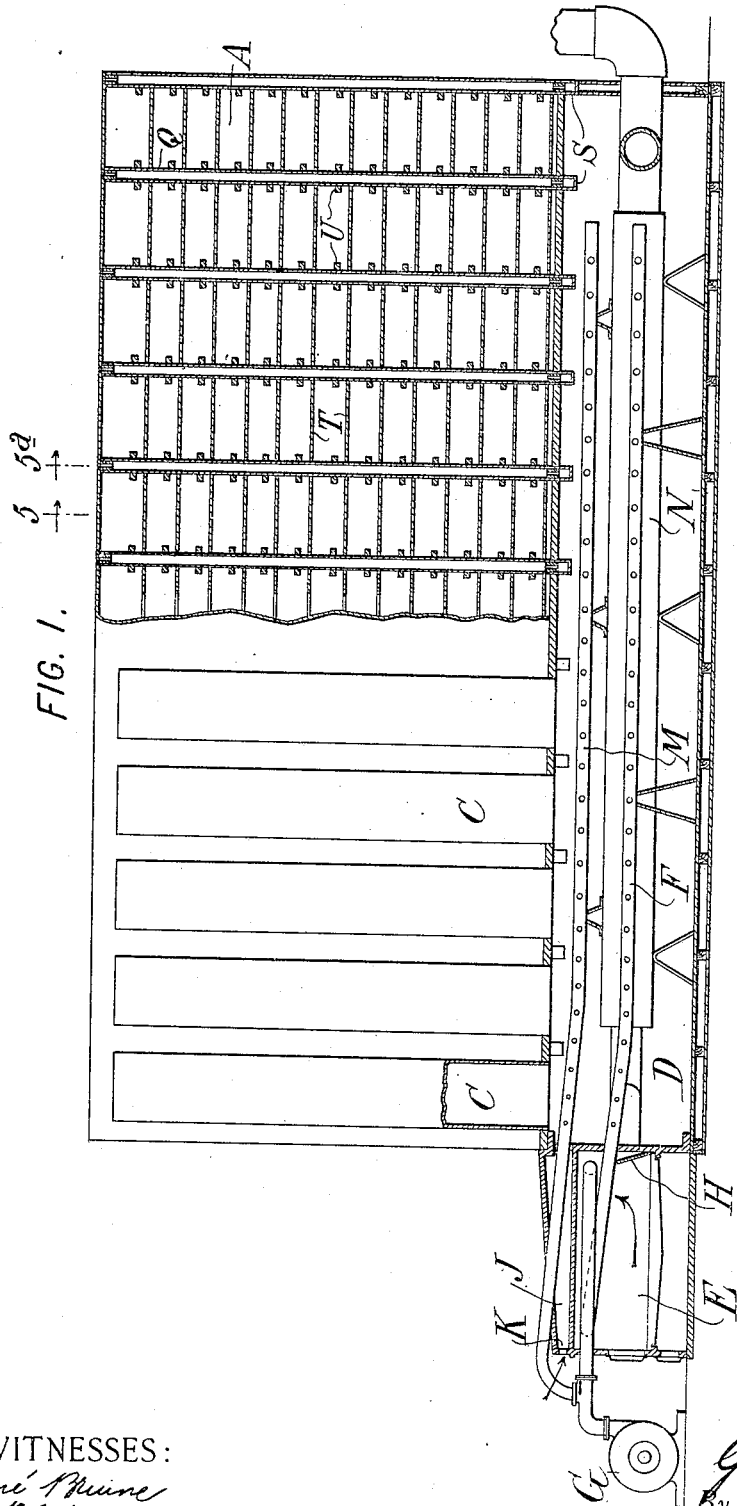

No. 774,321. PATENTED NOV. 8, 1904.
G. D. HARRIS.
DRYING APPARATUS.
APPLICATION FILED FEB. 12, 1904.
NO MODEL. 3 SHEETS—SHEET 1.

WITNESSES:

INVENTOR:
Gordon Don Harris
By Attorneys,
Arthur E. Chaser & Co.

No. 774,321. PATENTED NOV. 8, 1904.
G. D. HARRIS.
DRYING APPARATUS.
APPLICATION FILED FEB. 12, 1904.
NO MODEL. 3 SHEETS—SHEET 2.

WITNESSES:

INVENTOR:
By Attorneys,

No. 774,321. PATENTED NOV. 8, 1904.
G. D. HARRIS.
DRYING APPARATUS.
APPLICATION FILED FEB. 12, 1904.
NO MODEL. 3 SHEETS—SHEET 3.
FIG. 5. FIG. 6.
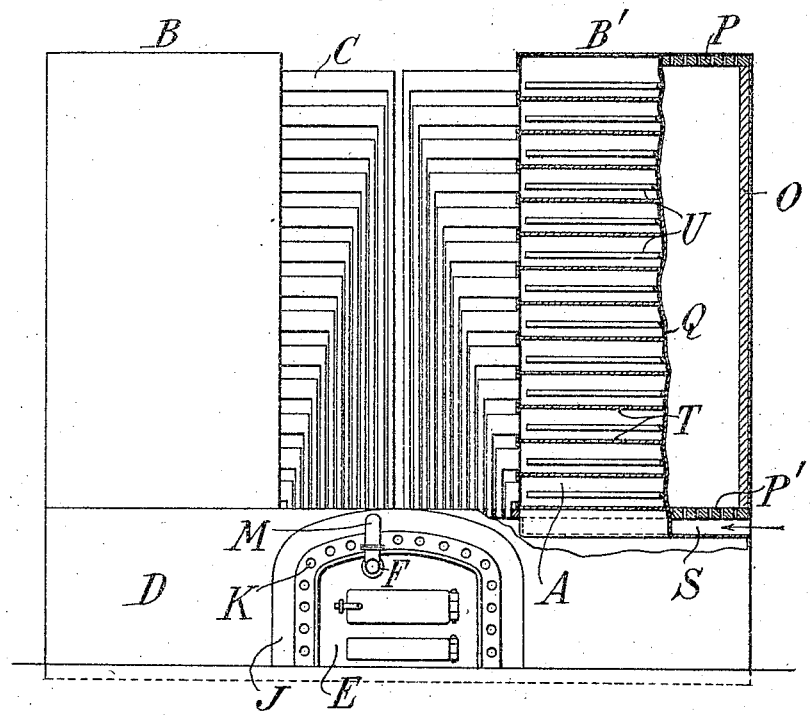
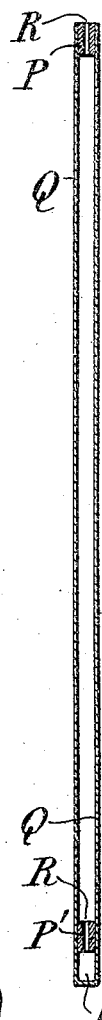
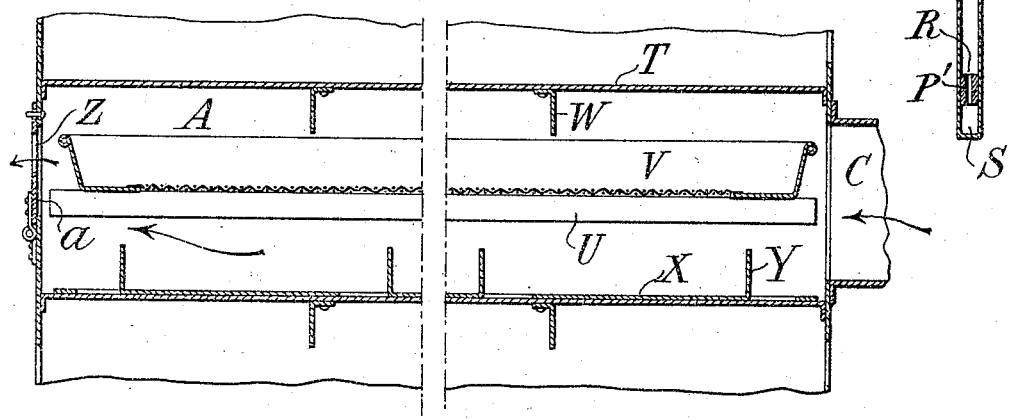
FIG. 7.
WITNESSES:
René Bruine
[signature]
INVENTOR:
Gordon Don Harris
By Attorneys,
Arthur E. Fraser & Co.

No. 774,321. Patented November 8, 1904.

UNITED STATES PATENT OFFICE.

GORDON DON HARRIS, OF BAYSHORE, NEW YORK, ASSIGNOR TO CONDENSED PURE FOOD COMPANY, OF COHOCTON, NEW YORK, A CORPORATION OF NEW YORK.

DRYING APPARATUS.

SPECIFICATION forming part of Letters Patent No. 774,321, dated November 8, 1904.

Application filed February 12, 1904. Serial No. 193,192. (No model.)

*To all whom it may concern:*

Be it known that I, GORDON DON HARRIS, a citizen of the United States, residing at Bayshore, Suffolk county, New York, have invented certain new and useful Improvements in Drying Apparatus, of which the following is a specification.

This invention aims to provide certain improvements in drying apparatus, and especially in apparatus for the drying of solid food products—such, for example, as vegetables and fruits—and also liquid products—such, for example, as milk. With this improved apparatus the material can be desiccated to substantially perfect dryness.

A special feature of the invention is the drying of the material without cooking the same. Where merely the high temperature of the air or other drying-current is depended upon to desiccate a material, the moisture in the air or the moisture of the material serves in conjunction with the high temperature to cook the food and destroy the raw taste, the securing of which is a particular object of this invention. According to this invention the steam or moisture is carried away or precipitated as fast as possible, the use of a large volume of dry air being the principal reliance in extracting the moisture. The mechanical construction of the apparatus is such as to facilitate work on a large scale, permitting the use of a great number of small separate drying-cells and presenting other advantages referred to in detail hereinafter.

The apparatus includes a plurality (preferably two) of groups of drying-cells. The inlet-conduits for these cells are arranged between the groups, and the doors for the cells are arranged on the outer sides, so that a great number of cells may be provided and made easily accessible. Preferably the cells in each group are arranged in a number of adjacent vertical rows alongside of each other, and preferably, also, the drying-current is distributed to the cells from an elongated chamber extending the length of the entire group and having a separate conduit leading therefrom to each cell.

The accompanying drawings illustrate an apparatus embodying the invention.

Figure 3:
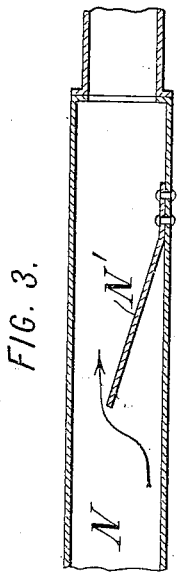
Figure 2:
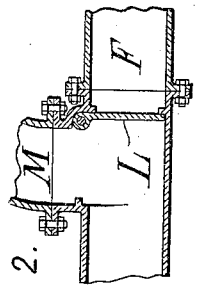
Figure 4:
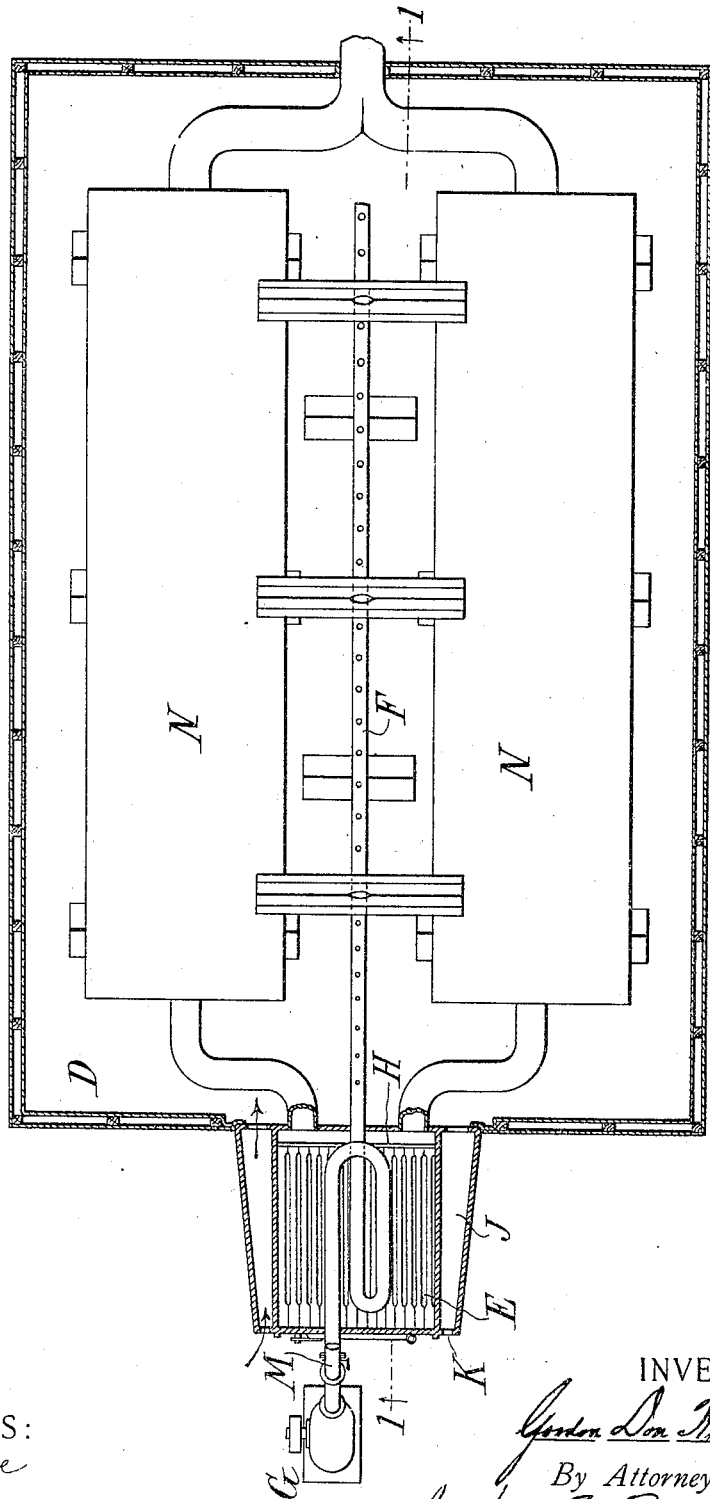

Figure 1 is a longitudinal section on the line 1 1 of Fig. 4, showing certain parts in elevation. Fig. 2 is a section of a detail. Fig. 3 is a longitudinal section of an end portion of one of the radiators shown in Fig. 1. Fig. 4 is a horizontal section through the air-chamber, showing the inside parts in plan. Fig. 5 is a front elevation showing certain parts at the right in section on the lines 5 and 5ª of Fig. 1. Fig. 6 is a sectional view of one of the ventilated double partitions. Fig. 7 is a longitudinal section of a single cell.

The drying-cells A are arranged in two groups, (see Fig. 5,) lettered as a whole B and B'. Each group comprises, as indicated, a number of vertical rows of cells arranged alongside of each other. The groups B and B' are arranged back to back, with conduits C between them, preferably one conduit for each of the cells. The lower ends of the several conduits open into a large chamber D, extending, preferably, the full length and width of the two groups of cells. The chamber D forms a distributing-chamber from which the drying-current, preferably in the form of heated or dried air, is conducted uniformly and at a rapid rate through the various drying-cells. The air-chamber forms, as it were, a sort of reservoir from which air may be passed freely and in great quantities through the cells. This arrangement permits the use of a large number of comparatively small cells each with its own independent current of air, so that as soon as the air has taken up a small quantity of moisture it passes out and does not pass continuously over more moist material, heating and steaming the same, as has been the case where a few large cells have been used. Owing to the large size of the air-chamber D, the velocity of flow of the air is checked in passing through the chamber, and this, together with the metallic walls and the separated metallic conduits C and the ventilated partitions hereinafter described between the vertical rows of cells, tends to precipitate any excess of moisture which the air-current may carry.

This apparatus is especially economical of heat. A furnace E is provided at one end of and preferably outside of the air-chamber D. A hot-air pipe F, perforated with holes gradually increasing in size toward the inner end, carries a current of air from an air-pump or fan G, and between the fan G and the chamber passes through the upper part of the furnace in a horizontal coil, as shown. A baffle-plate H is arranged at the rear of the furnace to concentrate the heat on the coil. In addition the furnace is provided with a surrounding air-space J, with openings K at the outer end and corresponding openings at the inner end. Through these openings a quantity of warm air is sucked into the apparatus by the current from the pipe F. By means of a damper L, Fig. 2, the blast from the fan may be diverted from the hot-air pipe F into the pipe M, which carries cooler air, preferably ordinary atmospheric air, and which pipe is perforated similarly to the hot-air pipe. By turning the blast into the pipe M the overheating of the material may be checked and any accumulation of steam dissipated at once, or the damper may be held in an intermediate position to regulate accurately the temperature of the air being supplied.

In order to further economize heat, the exhaust or smoke pipe from the furnace passes through a pair of large rectangular sheet-metal boxes or radiators N, arranged in the chamber D and supported a slight distance above the floor of the latter. The passage of the smoke through the radiators N is retarded and the efficiency increased by means of baffles N', Fig. 3, arranged at suitable intervals in the lengths of the radiators. From the radiators N the products of combustion pass out to the chimney at the rear of the apparatus.

The apparatus is built very economically and strongly with a framing of wood covered with sheet metal, and the partition-walls between the vertical rows of cells are ventilated so as to prevent the overheating and steaming of the material above referred to. For example, each partition, and preferably each end wall also, is made with vertical posts O and top and bottom horizontal members P and P' of wood—for example, two inches by two inches in cross-section—and the rectangular frame thus formed is incased in sheet-iron Q, forming a hollow wall or partition. The horizontal top and bottom members P and P' are apertured, as indicated best in Fig. 6, with a number of apertures R, through which the air circulates continually on account of the heat supplied to the cells and transmitted to the metal Q. The metal is extended below the lower wooden member P' to form a conduit S, open at the outside of the apparatus for the admission of atmospheric air.

For compactness the horizontal partitions T between the cells of each vertical row are made of single sheets of metal; but they may be of any other suitable construction. Each cell may be provided with supports U at the sides for carrying a tray V of the material to be dried. Baffles W project downwardly from the top, and a removable baffle-plate X is provided, with baffles Y struck up therefrom. This removable baffle-plate may be arranged in the bottom of the cell, as shown, so as to act in conjunction with the upper baffles W to force the current alternately upward and downward through the material resting on the perforated bottom of the tray. For liquid materials a solid tray may be used. Each cell may carry two trays by inverting the removable baffle-plate X and resting it on the side supports U and placing one tray on the bottom of the cell and the other on the top of the baffle-plate X. With this arrangement the current passes not through but over the material, and it is especially adapted therefore for liquids. The outlet for each cell is preferably by way of one or more apertures Z in the outwardly-opening doors $a$, which, as previously stated, are arranged on the outside of the apparatus. The cells are long and narrow, being of hardly greater cross-section than the conduits C and bringing practically all the air passing through them into contact with the material. The outlets of the individual cells may be closed in any desired manner. The complete separation of each cell from the others makes it possible to dry different materials without spoiling one by contact with the odors of the others.

Though I have described with great particularity of detail a complete apparatus embodying my invention, yet it is not to be understood that the invention is limited to the particular embodiment disclosed.

Various modifications thereof in detail and in the arrangement and combination of the parts may be made by those skilled in the art without departure from the invention.

What I claim is—

1. In a drying apparatus, a plurality of groups of drying-cells, inlet-conduits to said cells arranged between or on the inner sides of said groups, and outlets for said cells on the outer sides of the groups, the outlet for each cell communicating directly with the atmosphere.

2. In a drying apparatus, a plurality of groups of drying-cells, inlet-conduits to said cells arranged between or on the inner sides of said groups, and doors for said cells on the outer sides of the groups, the outlet for each cell being through its door directly to the atmosphere.

3. In a drying apparatus, a chamber D through which the drying-current passes, groups B and B' of drying-cells, each comprising a plurality of adjacent vertical rows of cells arranged alongside each other, conduits C between said groups and connecting the cells with said chamber, and doors for said cells arranged on the outside of the apparatus.

4. In an apparatus for drying food products, a chamber D, a group of separate drying-cells A, and a series of conduits C for conducting a drying-current from said chamber to said cells, said conduits being spaced apart and separate from each other and one conduit being provided for each cell.

5. In a drying apparatus having a conduit for a drying-current, a hollow wall having its space connected with the atmosphere, and being independent of the conduit for the drying-current, whereby to prevent overheating.

6. A drying apparatus having a conduit for a drying-current, and including adjacent vertical rows of drying-cells having spaces between them open to the atmosphere, said spaces being independent of the conduit for the drying-current, whereby to prevent overheating.

7. In a drying or desiccating apparatus, an air-chamber, a furnace, a chimney, a radiator in the air-chamber, flues connecting the radiator with the furnace and chimney, elongated cells to contain the material to be dried or evaporated, separate air-conduits connecting the respective cells at one end with said air-chamber, and doors at the opposite ends of the respective cells.

8. In a drying or desiccating apparatus, an air-chamber, means for supplying air to said chamber and heating it, a plurality of superposed, elongated drying-cells, an air-conduit connecting the air-chamber with one end of each of said cells, and a door at the opposite end of each cell.

9. In a drying or desiccating apparatus, an air-chamber, means for supplying air to said chamber and heating it, a plurality of superposed, elongated, horizontally-disposed cells with metal walls, mounted on the said air-chamber, each of said chambers provided with supports for pans to contain the material to be heated, and with baffles or deflectors, above and below, air-conduits, one for each cell, connecting the respective cells at one end with the air-chamber, and doors in the opposite ends of the respective cells.

10. A cell for a drying apparatus, said cell being of elongated tubular form and provided at its sides with supports for a tray, at one end with an inlet for heated air, at its other end with a door having in it outlets for the hot air, at its top with fixed pendent baffles or deflectors, and below with removable and reversible deflectors or baffles.

11. In a drying apparatus, an air-chamber, a radiator in said air-chamber, means for supplying air to said chamber and heating it, a plurality of superposed elongated horizontally-disposed cells mounted on said air-chamber, air-conduits one for each cell connecting the respective cells at one end with the air-chamber, and doors in the opposite end of the respective cells.

In witness whereof I have hereunto signed my name in the presence of two subscribing witnesses.

GORDON DON HARRIS.

Witnesses:
DOMINGO A. USINA,
THEODORE T. SNELL.